United States Patent

[11] 3,607,019

| [72] | Inventor | John F. Herink |
| | | Rock Springs, Wyo. |
| [21] | Appl. No. | 805,540 |
| [22] | Filed | Mar. 10, 1969 |
| [45] | Patented | Sept. 21, 1971 |
| [73] | Assignee | FMC Corporation |
| | | New York, N.Y. |

[54] PROCESS FOR PRODUCING A SODIUM POLYPHOSPHATE FROM AN AQUEOUS ORTHOPHOSPHATE SOLUTION
1 Claim, 2 Drawing Figs.

[52] U.S. Cl. ................................................. 23/107, 159/48
[51] Int. Cl. ................................................. C01b 25/30, C01b 25/38
[50] Field of Search ..................................... 23/106 A, 106, 107; 159/4 A, 48

[56] References Cited
UNITED STATES PATENTS
| 2,874,027 | 2/1959 | Gloss | 23/107 |
| 2,898,189 | 8/1959 | Rodis et al. | 23/107 |
| 3,023,083 | 2/1962 | Rodis et al. | 23/107 |
| 3,499,476 | 3/1970 | Hartlapp et al. | 159/48 |

Primary Examiner—Oscar R. Vertiz
Assistant Examiner—Gregory A. Heller
Attorneys—Eugene G. Seems, Charles C. Fellows and Frank Ianno

ABSTRACT: A spray-drying process for producing a sodium polyphosphate from an aqueous sodium orthophosphate solution by spraying the orthophosphate feed solution through a plurality of atomizing spray nozzles downward through a zone containing a truncated cone-shaped flame in such manner that a minimum of the atomized orthophosphate solution passes directly through the cone flame, drying the orthophosphate feed solution to a dried orthophosphate and by continued drying, converting the dry orthophosphate to a sodium polyphosphate and separating the polyphosphate from the drying gas.

INVENTOR
JOHN F. HERINK

PROCESS FOR PRODUCING A SODIUM POLYPHOSPHATE FROM AN AQUEOUS ORTHOPHOSPHATE SOLUTION

BACKGROUND OF THE INVENTION

1. Field of the Invention

Process for producing sodium polyphosphate and pyrophosphates.

2. Description of the Prior Art

Concentration and drying of liquids by atomization is conventionally brought about in a tower by passing the liquid through atomizing nozzles and subjecting the atomized liquid to heated dry air. The heated air introduced to the tower is heated directly or indirectly outside the atomization tower. This process has been used to produce sodium phosphates in a two-step process in which an orthophosphate feed liquor is atomized and dried in a tower to a dry orthophosphate. The dried orthophosphate is then calcined in a separate step at an elevated temperature to produce the polyphosphates and pyrophosphates.

An improved process for producing a sodium polyphosphate from an aqueous orthophosphate solution is disclosed in U.S. Pat. No. 3,023,083. The process disclosed atomizes an aqueous orthophosphate solution in the upper area of a spray zone and simultaneously introduces drying air into the upper area of the spray dryer while directing the atomized solution downwardly from the center of the top of the drying zone through a downwardly extending cone-shaped flame. The sodium polyphosphate is collected in a lower portion of the spray drying zone. The sodium polyphosphates produced by the process of U.S. Pat. No. 3,023,083 contain a major portion of fine particles that pass through 80 mesh sieves. This was desirable, as there was a large market for "minus 100 mesh" sodium tripolyphosphate at the time the patented process was developed. During the period from 1962, the date of issuance of the patent, through 1968, the demand for granular sodium tripolyphosphate greatly increased. Thus, it is now necessary to produce granular, minus 14 mesh to plus 80 mesh, sodium polyphosphates.

Particle size distribution in the process of U.S. Pat. No. 3,023,083 using a single, large nozzle can be changed by varying the atomizing steam rates, feed viscosity, feed density, surface tension, and exit velocity from the nozzle.

It is possible to get a major proportion of granular material, but only at the expense of cutting down production to an uneconomical rate. At commercially desirable rates of production, the process seems to inherently produce far more fines than granule.

A one-step continuous spray drying process for producing sodium polyphosphates from an orthophosphate feed liquor, utilizing conventional equipment, in which the product has an increased amount of granular material is desired.

SUMMARY OF THE INVENTION

I have now discovered an improved process for making a highly granular sodium polyphosphate in a single step in a spray drying zone employing a truncated cone-shaped flame. The process comprises atomizing a liquid sodium orthophosphate feed liquor, having a sodium to phosphate molar ratio of 1:1 to 2:1, through a plurality of atomizing nozzles that are arranged in a ring, which is concentric to and within a ring of burners that produce the cone-shaped flame. The nozzles atomize the orthophosphate liquid in a downwardly direction, generally parallel to the side of the truncated cone-shaped flame. The atomizing nozzles and burners are generally arranged and aimed to provide about the maximum amount of distance between the atomizing nozzles and the wall of the spray drying zone. Each nozzle's spray pattern is directed so that a minimum amount of the spray passes through the flame. Preferably none of the spray pattern passes through the flame. Surprisingly, compared to the prior art, very high production rates can be obtained together with an increase in the amount of granular product produced.

Figure 1:
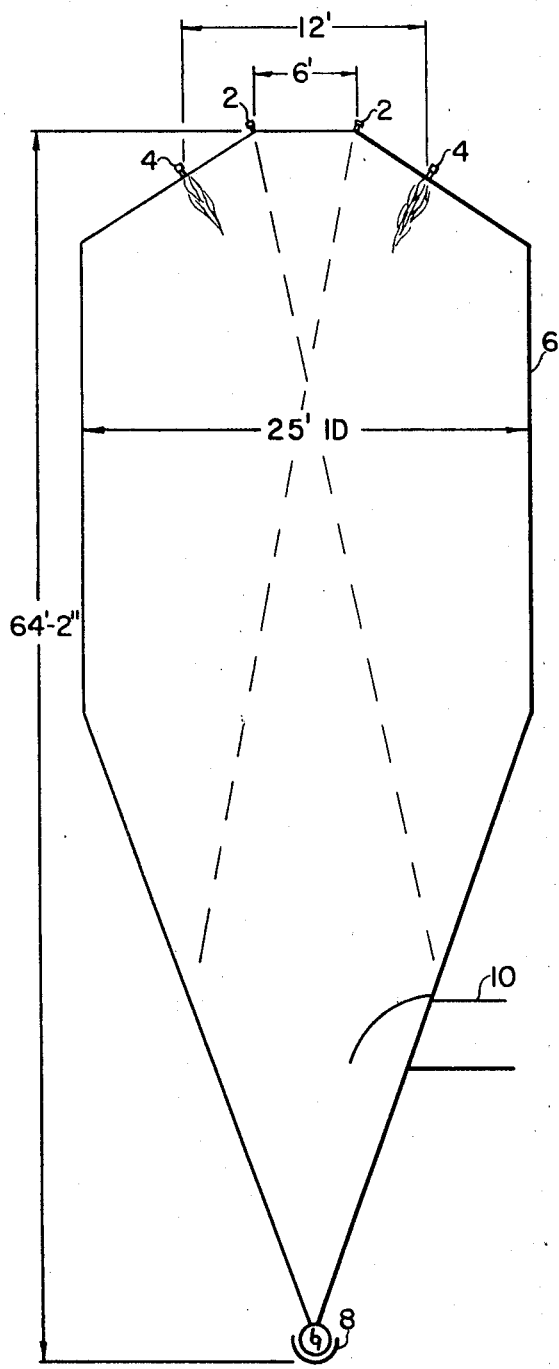
FIG. 1 is a schematic drawing of a modified commercial size spray dryer.

Description of the Invention and the Preferred Embodiments

The spray drying zone utilized in practicing this invention is the type in which air is heated inside the drying zone. The necessary drying heat is supplied by a ring of burners, which generally burn a gas such as natural gas, methane, carbon monoxide and the like. Design of the drying zone or tower is within the general engineering ability of those skilled in this art. For example, drying units varying from about 10 to about 25 feet in diameter and about 25 to 65 feet high have been used. The number of burners supplying the necessary heat varies from 8 to 64 in commercial use, depending on burner design and the amount of heat required (equipment size and process requirements). In order to produce sodium polyphosphates, the burners must impart sufficient heat to remove water of solution and to heat the dried orthophosphate to above 190° C. in order to convert the dried sodium orthophosphate into a sodium polyphosphate.

The process uses aqueous sodium orthophosphate solutions containing sodium to phosphorus mol ratios of 1:1 to 2:1. The solutions are fed to the tower at about 100° C. and the orthophosphate concentration in the feed liquor is about as high as possible, but slightly less than a completely saturated solution so that the sodium orthophosphate does not crystallize out of solution in the feed lines. The high concentration and elevated temperature of the feed solution facilitate water removal in the tower. Less concentrated feed solutions and lower feed liquor temperatures can be used. However, these compositions are not used in commercial practice as this lowers the capacity of the spray-drying unit. Typical sodium orthophosphate feed solutions have a specific gravity of 1.590 to 1.625 at temperatures of 95° C. to the solutions boiling point of about 112° C.

The orthophosphate solution is introduced into the upper area of the spray drying zone, through a plurality of atomizing nozzles. Some air can enter or be introduced simultaneously with the feed solution into the upper area of the spray drying zone. The upper part of the spray drying zone or tower contains a plurality of burners arranged in a ring shaped manner, with descending burner openings facing each other, at an angular position, to form a conelike flame zone. The ring of burners is of such size in relationship to the diameter of the drying zone that the cone-shaped flame produced by the burners is shaped like a truncated cone with an opening in the lower end of the flame cone. Inside the ring of burners, on a smaller diameter circle, are spaced a plurality of atomizing nozzles through which the aqueous orthophosphate feed liquor is sprayed downward in the drying zone through the opening in the truncated flame cone.

The number of nozzles to be employed in any specific spray drying equipment is a matter of engineering choice. For example, the four nozzles capable of spraying 15 gallons of feed solution per minute in the equipment described above could be replaced by three nozzles, each capable of spraying 20 gallons per minute, or eight nozzles, each capable of spraying 7.5 gallons per minute. Using a plurality of nozzles has the advantages of easy nozzle replacement, no down time of the spray drying equipment during nozzle repair or replacement of a nozzle, and that the small nozzles apparently inherently require less steam to aspirate the orthophosphate feed solution than did the single nozzle of the prior art.

The temperature of the spray particles must reach at least 190° C. in the dryer to convert a sodium orthophosphate feed solution to a sodium pyrophosphate or polyphosphate. The temperature inside the dryer shown in the figure is maintained by controlling the exit gas temperature. Sodium tripolyphosphate (STPP) is normally a crystalline anhydrous product capable of having two distinct crystalline anhydrous product capable of having two distinct crystalline forms. (See U.S. Pat. No. 3,399,959). Form II STPP, containing very little Form I STPP is produced when the exit gas temperature is at about 290° C. to 310° C. Form II STPP, containing a normal Form I content of about 20 to 30 percent is produced by maintaining the exit gas temperature between about 360° to 390° C. Form I STPP, containing about 30 to 40 percent Form I STPP, is produced when the exit gas temperature is about 400°–410° C., and higher Form I content can be obtained at higher exit gas temperatures.

Figure 2:
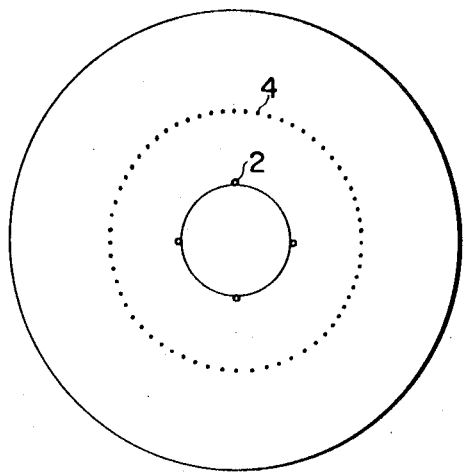
FIG. 2 is a schematic drawing of the top of the dryer showing the placement of 4 atomizing nozzles and 64 burners in the dryer.

A typical spray dryer useful in practicing this invention is shown schematically in FIGS. 1 and 2. FIG. 1 shows the general design, shape and size of the dryer and FIG. 2 shows the placement of four atomizing nozzles and 64 burners in the top of the dryer.

The process for the production of sodium tripolyphosphate is described with reference to FIG. 1. A nearly saturated feed solution of sodium orthophosphate having a specific gravity of 1.610 to 102° C. is fed at a temperature of 102° C. to spray nozzles 2 of which there are four equally spaced on a 6 foot diameter circle in the top of the dryer. The feed solution is atomized through the nozzles downward through spray dryer 6 toward the furthest wall of the dryer from the nozzles, through the opening of a flame cone produced by the burners 4, of which there are 64 equally spaced around a 12 foot diameter circle in the top of the dryer. The orthophosphate feed rate and the burners are adjusted so that the exit gas temperature leaving the dryer through line 10 is about 370° C. The atomized orthophosphate feed solution is dried and converted to sodium tripolyphosphate while passing through the dryer and the product sodium tripolyphosphate is collected in the dryer bottom. The product is removed from the dryer bottom by screw conveyor 8 and transported to cooling and storage facilities.

The spray dryer shown in FIGS. 1 and 2 was used in a series of spray drying studies. Four spray nozzles were arranged on a 6 foot diameter circle atop the spray dryer and each nozzle was aimed downwardly through the spray dryer at a point on the wall of the dryer about 6 feet above the end of the lower cone-shaped portion of the dryer. Each of the four nozzles was capable of atomizing 15 gallons of orthophosphate feed liquor per minute. Sixty-four burners, arranged on a 12 foot diameter circle were used to supply the necessary drying heat. The burners were directed downwardly to form a truncated cone-shaped flame pattern. The feed rate of the orthophosphate solution was set at 15 gallons per minute for each nozzle, 60 gallons per minute total feed rate, and the burners adjusted so that the exit gas temperature from the bottom of the spray dryer was about 370° C. The orthophosphate feed solution was atomized downwardly through the opening in the flame cone. The spray patterns of the atomizing nozzles were directed or aimed so that a minimum amount of the spray pattern passed through the flame. Dried sodium tripolyphosphate collected in the bottom of the spray dryer. This process produced 24,500 pounds of sodium tripolyphosphate per hour from a nearly saturated orthophosphate feed solution which was fed to the spray-drying zone at a temperature of almost 100° C. Only 2,200 pounds of steam were used per hour to aspirate the feed solution. The product produced was 56 percent granular.

Using the signal nozzle process described in U.S. Pat. No. 3,023,083, the spray dryer described above and spraying through the flame required 5,600 pounds of steam per hour to aspirate enough sodium orthophosphate feed solution to produce 15,000 pounds of sodium tripolyphosphate per hour that was 52 percent granular. When the production rate of this single nozzle process was raised to 20,600 pounds of sodium tripolyphosphate per hour, 7,600 pounds of steam per hour was used, and only 27 percent of the product was granular. The details of these spray drying studies, which all used a sodium orthophosphate feed solution with a specific gravity of 1.610 at 102° C., are set forth in the following Table.

TABLE I

Comparison Examples

|  | A | B | 1 |
|---|---|---|---|
| Number of Nozzles | 1 | 1 | 4 |
| Nozzle location | Centered | Centered | 6 ft. diameter circle |
| Spray Dryer Feed Rate, g.p.m. | 36 | 50 | 60 |
| Spray Dryer Production Rate, lb. STPP/hr. | 15,000 | 20,000 | 24,500 |
| Steam Usage lb./hr. | 5,600 | 7,600 | 2,200 |
| Typical Particle Size Distribution of Dryer Spill, U.S. Standard Sieve Scale |  |  |  |
| % +20 | 5.0 | 1.0 | 2 |
| +30 | 9.1 | 2.5 | 9 |
| +40 | 15.2 | 5.9 | 14 |
| +50 | 23.0 | 7.2 | 24 |
| +70 | 41.7 | 18.7 | 45 |
| +80 | 52.3 | 27.5 | 56 |
| +100 | 62.2 | 35.2 | 63 |
| +140 | 75.1 | 59.0 | 77 |
| +200 | 85.3 | 68.0 | 88 |

These data show that the prior art process produced 15,000 pounds per hour of sodium tripolyphosphate that was 52 percent granular. By increasing the feed rate from 36 gallons per minute to 50 gallons per minute and the aspirating steam rate from 5,600 to 7,600 pounds per hour, it was possible to increase the production of sodium tripolyphosphate to 20,600 pounds per hour; however, the amount of granular in the product dropped to only 27.5 percent. Surprisingly, using the process of the present invention, the feed rate could be increased to 60 gallons per minute and the aspirating steam consumption reduced to 2,200 pounds to produce sodium tripolyphosphate at the rate of 24,500 pounds that was 56 percent granular sodium tripolyphosphate.

Obviously, the examples can be endlessly expanded as the mol ratios of sodium to phosphorus are varied from 1:1 to 2:1 to vary the polyphosphate produced from sodium metaphosphate to sodium pyrophosphate.

I claim:

1. In the process for producing a sodium polyphosphate from an aqueous orthophosphate starting solution having a sodium to phosphorus molar ratio of 1:1 to 2:1 by introducing the aqueous orthophosphate solution in the upper area of a spray-drying zone, atomizing the solution downwardly through a downwardly extending cone-shaped flame zone and separating the dried polyphosphate from the drying gases having an exit temperature of at least 190° C., in which the improvement comprises atomizing the sodium orthophosphate feed solution through a plurality of spray nozzles downwardly through the spray drying zone in which the flame cone zone is truncated before it converges to an apex, so as to leave a flame-free opening in the downward and smaller end of the truncated flame cone, the atomizing spray passing downwardly through the flame-free opening in the downward end of the truncated flame cone.

UNITED STATES PATENT OFFICE
CERTIFICATE OF CORRECTION

Patent No. 3,607,019　　　　　　Dated September 21, 1971

Inventor(s) John F. Herink

It is certified that error appears in the above-identified patent and that said Letters Patent are hereby corrected as shown below:

Column 3, lines 1 and 2 "anhydrous product capable of having two distinct crystalline" second occurrence should be omitted since it has been printed twice.

Column 4, Table I, line 20 "20,000" should read --20,600--.

Signed and sealed this 1st day of October 1974.

(SEAL)
Attest:

McCOY M. GIBSON JR.　　　　　　C. MARSHALL DANN
Attesting Officer　　　　　　　Commissioner of Patents